Feb. 14, 1933. P. MOSTAZA 1,897,853
VEHICLE BRAKE
Filed April 17, 1930 3 Sheets-Sheet 1
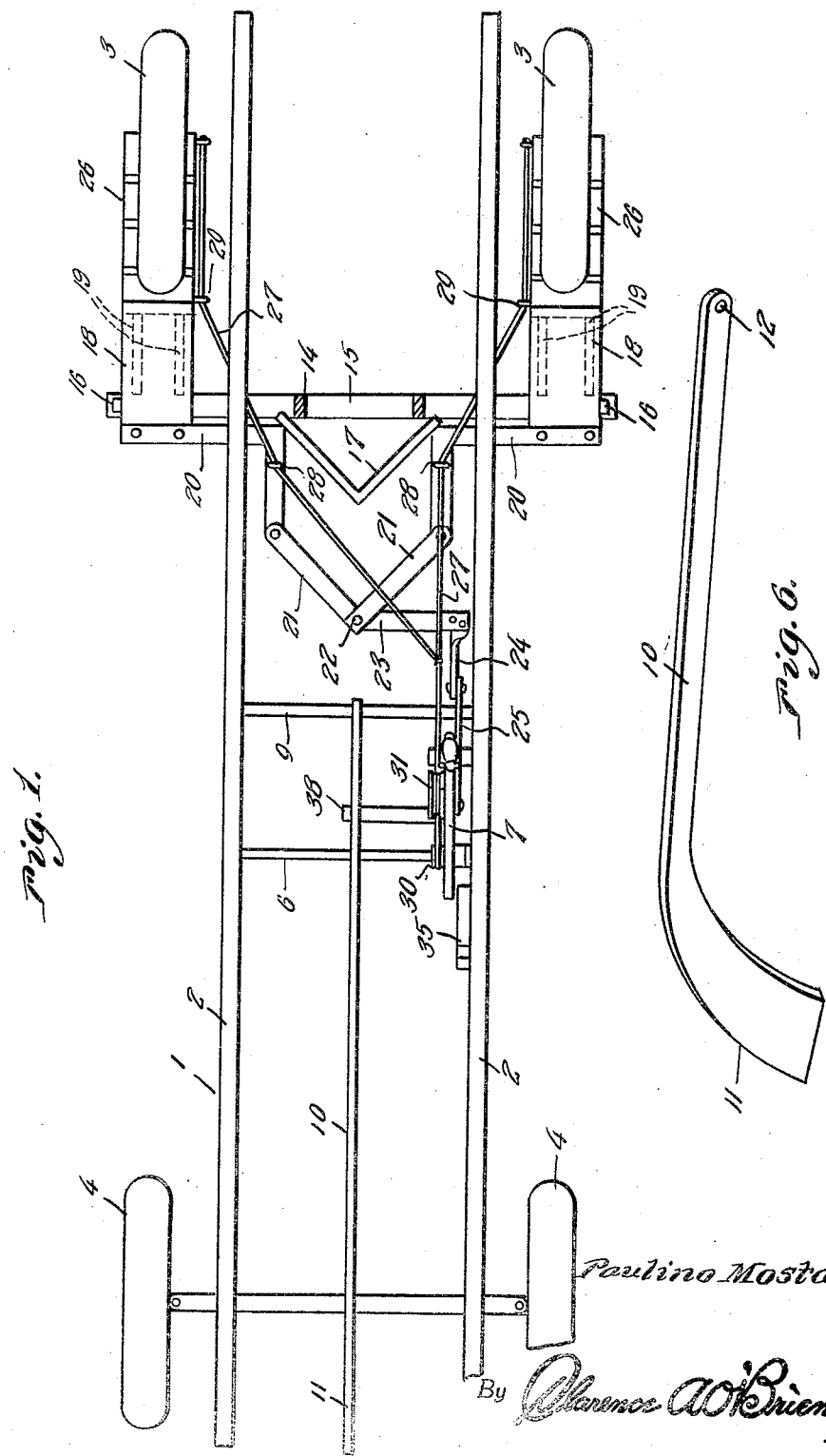
Inventor
Paulino Mostaza
By Clarence A. O'Brien
Attorney Feb. 14, 1933.   P. MOSTAZA   1,897,853
VEHICLE BRAKE
Filed April 17, 1930   3 Sheets-Sheet 2
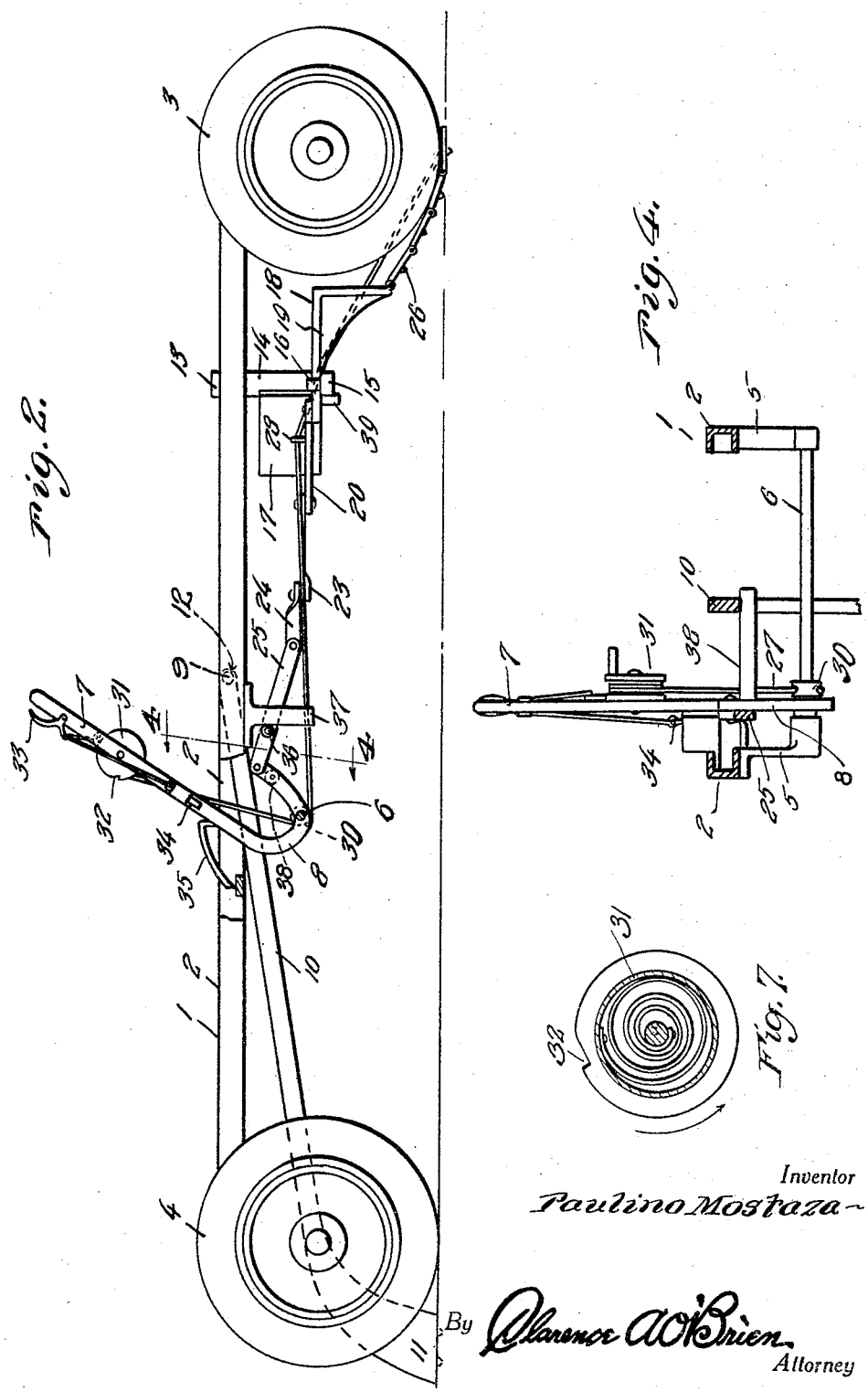
Inventor
Paulino Mostaza
By Clarence A. O'Brien
Attorney Feb. 14, 1933.     P. MOSTAZA     1,897,853
VEHICLE BRAKE
Filed April 17, 1930     3 Sheets-Sheet 3
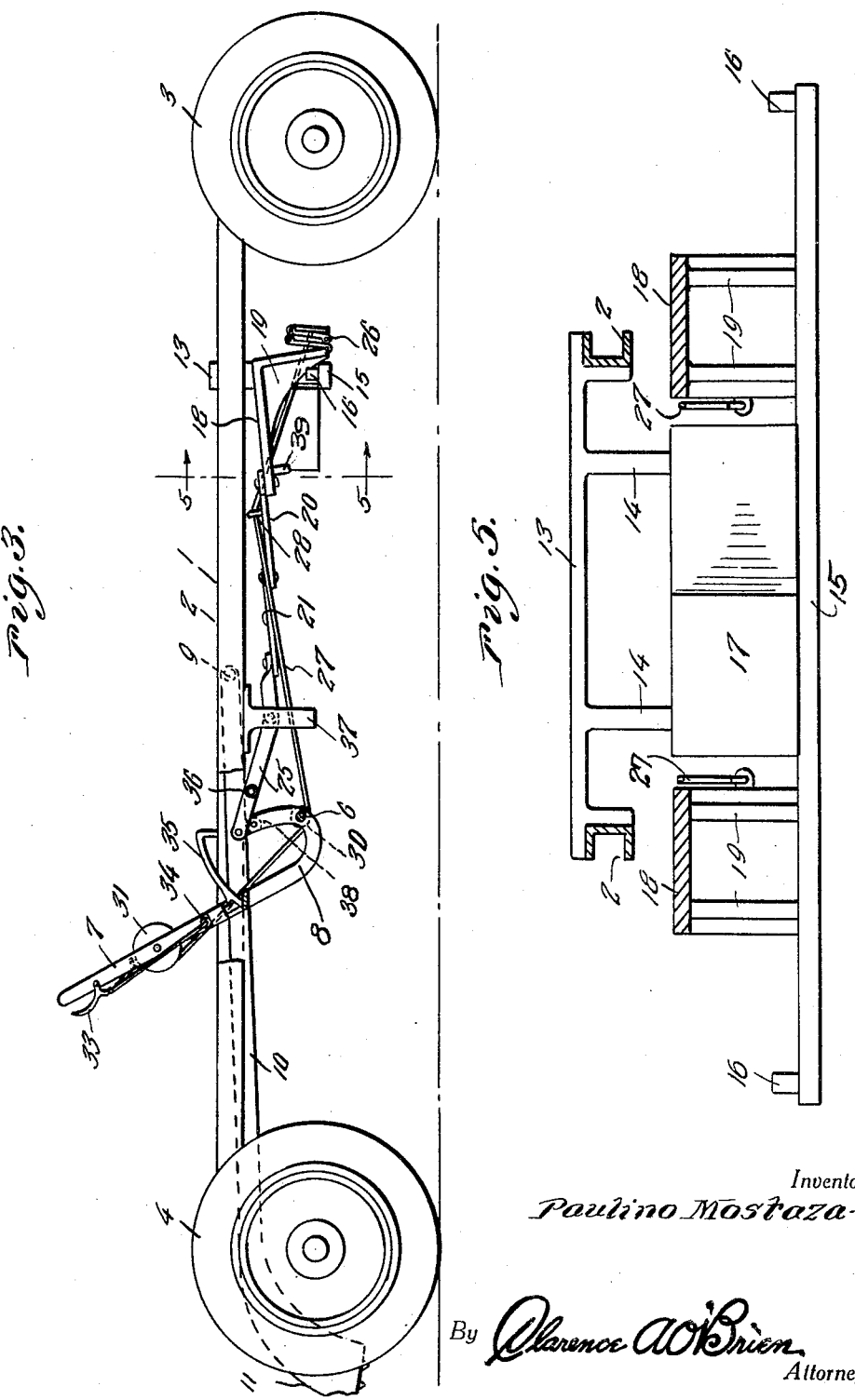
Inventor
Paulino Mostaza
By Clarence A. O'Brien
Attorney Patented Feb. 14, 1933

1,897,853

UNITED STATES PATENT OFFICE

PAULINO MOSTAZA, OF NEWARK, NEW JERSEY

VEHICLE BRAKE

Application filed April 17, 1930. Serial No. 445,022.

This invention relates to new and useful improvements in vehicle brakes and more particularly to devices of this character which are especially adapted for use on automobiles, trucks, etc.

The primary object of the invention is to provide, in a manner as hereinafter set forth, a vehicle brake of the aforementioned character of the ground engaging type which is adapted to be used in emergencies for effectively and promptly bringing the vehicle to a stop under any conditions of the street or highway, such as when the same is slippery from snow, ice or water.

Other objects of the invention are to provide a vehicle brake of the character described which will be comparatively simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in top plan showing the wheeled chassis of a vehicle equipped with a brake constructed in accordance with this invention, said brake being shown in operative position.

Figure 2 is a view in side elevation thereof.

Figure 3 is a view similar to Figure 2 but showing the brake in inoperative position.

Figure 4 is a sectional view taken through the chassis of the vehicle substantially on the line 4—4 of Figure 2 showing the supporting means for the actuating lever.

Figure 5 is a cross sectional view taken substantially on the line 5—5 of Figure 3 looking in the direction indicated by the arrows.

Figure 6 is a detail view in perspective showing the forwardly projecting ground engaging arm.

Figure 7 is a detail view of the spring-controlled drum.

Referring to the drawings in detail, it will be seen that the reference numeral 1 designates generally the chassis of a vehicle including the side beams 2, the rear wheels 3 and the front wheels 4.

Depending from an intermediate portion of the longitudinal side members 2 of the chassis 1 is a pair of brackets 5 provided with sockets at their free ends for the reception of a horizontally disposed transversely extending bar 6 (see Figure 4). A hand operated lever 7 is provided, at its lower end, with a substantially U-shaped portion 8 which is rotatably mounted on one end portion of the shaft 6 in such a manner that the free end portion of said U-shaped portion 8 extends normally upwardly from said shaft 6.

A transversely extending shaft 9 is supported between the side members 2 of the chassis 1 in rearwardly spaced relation to the shaft 6 and pivotally mounted for swinging movement in a vertical plane on an intermediate portion of the shaft 9 is a forwardly extending arm 10 having an enlarged, downwardly curved free end portion constituting a ground engaging shoe 11. As clearly seen in Figure 6 of the drawings, the arm 10 is provided, in its rear end portion, with a transverse opening 12 for the passage of the shaft 9.

In rearwardly spaced relation to the shaft 9, the chassis 1 has mounted transversely thereon the horizontally disposed bar 13 having the integral depending hangers 14 depending therefrom to the lower ends of which is secured the horizontally disposed, transversely extending bar 15 having upstanding stop lugs 16 on its opposite end portion. As clearly illustrated in Figure 5 of the drawings, the bar 15 projects beyond the opposite side of the chassis 1. A horizontally disposed substantially V-shaped spreader plate 17 is fixed on an intermediate portion of the bar 15 and the purpose of said spreader plate will be more fully hereinafter set forth. Mounted for longitudinal and lateral sliding movement on the opposite end portions of the bar 15 is a pair of substantially L-shaped plates 18, the arms of which have extending therebetween the curved ribs 19 which engage on said bar 15. Rigidly secured to the forward end portion of each of the plates 18 is an L-shaped bracket 20 the angle of each of which is slidably engaged with the oppositely inclined sides of the spreader plates 17, as best illustrated in Figure 1 of the drawings. Forwardly converging links 21 are pivotally connected to the forward end portions of the bracket 20 and the forward end portions of the links 21 are pivotally connected, as at 22, to one end portion of an arm 23 which is rigidly connected to a longitudinally extending arm 24 and said arm 24 is, in turn, operatively connected to the adjacent end portion of the lever 7 for actuation thereby through the medium of the connecting link 25.

Hingedly mounted on the lower rear end of each of the plates 18 is a ground engaging shoe 26 which is formed of a series of hingedly connected sections. The shoes 26 are retained in folded inoperative position best seen in Figure 3 of the drawings through the medium of a pair of connected cables 27 which are trained through the eyes 28 and 29 on the bracket 20 and plate 18 respectively, and have their rear ends connected to the rearmost of the sections comprising said shoes. One of the cables 27 extends forwardly from a point of connection with the other of said cables and is trained under a pulley 30 which is rotatably mounted on the shaft 6 adjacent the lever 7 and said cable is windable on a spring controlled drum 31 mounted for rotation on an intermediate portion of said lever 7. It should be here mentioned that the normal tendency of the drum 31 is to unwind the cables 27 therefrom. The drum 31 is releasably retained against rotation when the cable is wound thereon through the medium of a detent engageable in the notch 32 and operable through the medium of the lever 33 pivotally mounted on the upper portion of the lever 7. A detent 34 is also operatively engaged with the lever 33 and is adapted for engagement with the notched bar 35 to retain the lever 7 in the forwardly disposed inoperative position illustrated in Figure 3 of the drawings. A stop member 36 is mounted on one side of the link 25 and engageable with a depending arm 37 fixed on the adjacent side bar 2 of the chassis 1 for limiting the rearward travel of said link 25.

As best illustrated in Figure 4 of the drawings, an arm 38 is fixed on the upturned end portion of the lever 7 and extends beneath the arm 10 for engagement therewith in a manner to maintain the ground engaging shoe 11 in elevated position when the lever 7 is in its forward position.

In use, the various elements constituting the invention are, when inoperative, in the position illustrated in Figure 3 of the drawings. Should an emergency arise in which it is desired to stop the vehicle, the operator grasps the lever 7 and actuates the lever 33 in a manner to free the drum 31 and disengage the detent 34 from the keeper bar 35. The spring drum 31 then pays out the cable and the plates 18 slide rearwardly and downwardly on the bar 15. The brackets 20 in engagement with the diverging sides of the spreader plate 17 cause the plates 18 to move outwardly in opposite directions on the bar 15 until the same engage with the upstanding stop lugs 16. In this position said plates will be disposed directly forward of the rear wheels 3. It is, of course, understood that the lever 7 is swung rearwardly to permit this movement of the plates. The sectional shoes 26 unfold by gravity and pass under the rear wheels 3. The plates 18 have depending from their forward end portions the retaining lugs 39 which prevent said plates from being pulled rearwardly completely off of the bar 15 and the vehicle will be effectively braked in an obvious manner.

When the lever 7 is swung rearwardly, the arm 38 will be swung downwardly with the result that the arm 10 swings downwardly by gravity and the shoe 11 comes into contact with the street or highway to further assist in the braking of the vehicle.

It is believed that the many advantages of a vehicle brake constructed in accordance with this invention will be readily understood, and although the preferred embodiment of the invention is as illustrated and described, it is to be understood that changes in the details of construction may be had which will fall within the scope of the invention as claimed.

What is claimed is:—

1. A vehicle brake of the character described comprising a supporting bar, a pair of angular plates slidably mounted for longitudinal and lateral movement on the supporting bar, a brake shoe mounted on each plate for movement therewith and adapted for disposition beneath one of the wheels of the vehicle and manually operable means for retaining the plates and the shoes in inoperative position on the supporting bar.

2. A vehicle brake of the character described comprising a supporting bar, a pair of plates slidably mounted for longitudinal and lateral movement on the supporting bar, a brake shoe mounted on each plate for movement therewith and adapted for disposition beneath one of the wheels of the vehicle, a forwardly extending pivotally mounted arm, said arm adapted for swinging movement in a vertical plane, a ground engaging shoe on the forward end of the arm, and means common to the arm and the plates and operatively connected thereto for retaining the same in inoperative position.

3. A vehicle brake of the character described comprising, in combination with a vehicle chassis, a supporting arm mounted on said chassis, said arm having its end portions disposed forwardly of the rear wheels of the vehicle, a pair of plates slidably mounted for longitudinal and lateral movement on the supporting arm, means for causing the lateral sliding movement of the plate, a brake shoe mounted on each of the plates for movement therewith, each brake shoe comprising a plurality of hingedly connected sections adapted for disposition beneath the rear wheels of the vehicle, manually operable means for retaining the plates in inoperative position on the supporting arm, means for retaining the section or brake shoe in folded position on the plates.

4. A vehicle brake of the character described comprising, in combination with a vehicle chassis, a supporting arm mounted on said chassis, said arm having its end portions disposed forwardly of the rear wheels on the vehicle, a pair of plates slidably mounted for longitudinal and lateral movement on the supporting arm, means for causing the lateral sliding movement of the plate, a brake shoe mounted on each of the plates for movement therewith, each brake shoe comprising a plurality of hingedly connected sections adapted for disposition beneath the rear wheels of the vehicle, manually operable means for retaining the plates in inoperative position on the supporting arm, means for retaining the sections or brake shoes in folded position on the plates, a forwardly projecting arm pivotally supported on the chassis, a ground engaging brake shoe on the forward end of the arm, and means for operatively connecting the arm to the plate retaining means in a manner to retain said arm in inoperative position and to release the same simultaneously with the release of the plate.

5. A vehicle brake of the character described comprising, in combination with a vehicle chassis, a supporting bar, the end portions of the bar disposed forwardly of the rear wheels of the vehicle, a pair of gravity actuated plates mounted for longitudinal sliding movement on the opposite end portions of the supporting bar, means mounted on said supporting bar for shifting the plates laterally upon longitudinal movement thereof, a foldable brake shoe hingedly mounted on each of the plates for movement therewith and adapted for disposition beneath the rear wheels of the vehicle, a forwardly projecting arm pivotally mounted on the chassis, a ground engaging brake shoe on the free end of the arm, a manually operable lever pivotally mounted on the chassis and operatively connected to the plates and to the arm in a manner to retain said plates and the arm in inoperative position, and means mounted on the lever and operatively connected to the foldable brake shoes to retain the same in folded inoperative position on the plates.

6. A vehicle brake of the character described comprising, in combination with a vehicle chassis, a supporting bar mounted on said chassis and having its end portions disposed forwardly of the rear wheels of the vehicle, a pair of gravity actuated plates slidably mounted for longitudinal movement on the bar, said plates normally disposed inwardly of the rear wheels, means mounted on the bar for shifting the plates laterally upon rearward longitudinal movement thereof to a position in longitudinal alignment with the rear wheels of the vehicle, a foldable brake shoe hingedly mounted on each of the plates for movement therewith and adapted for disposition beneath the rear wheels, means on the bar engageable with the plate in a manner to limit the lateral movement thereof, a forwardly extending arm pivotally mounted on the chassis, an integral ground engaging brake shoe on the forward end of the arm, a lever pivotally mounted on the chassis, a spring controlled drum mounted for rotation on the lever, a cable windable on the drum and connected to the foldable brake shoes in a manner to retain the same in inoperative position on the plates, means operatively connecting the lever to the plates in a manner to retain said plates in inoperative position, and means mounted on the lever and engageable with the arm in a manner to retain said arm in inoperative position.

In testimony whereof I affix my signature.

PAULINO MOSTAZA.